United States Patent [19]

Whiteside et al.

[11] Patent Number: 4,723,140
[45] Date of Patent: Feb. 2, 1988

[54] COMPACT FOLDING CAMERA CONSTRUCTION

[75] Inventors: George D. Whiteside, Lexington; Bruce K. Johnson, Andover, both of Mass.

[73] Assignee: Polaroid Corporation, Cambridge, Mass.

[21] Appl. No.: 28,457

[22] Filed: Mar. 20, 1987

Related U.S. Application Data

[63] Continuation-in-part of Ser. No. 866,066, May 20, 1986, abandoned, which is a continuation of Ser. No. 751,661, Jun. 24, 1985, abandoned.

[51] Int. Cl.[4] ............ G03B 15/03; G03B 17/04; G03B 19/12
[52] U.S. Cl. ............ 354/86; 354/149.11; 354/154; 354/155; 354/158; 354/187; 354/219
[58] Field of Search ............ 354/83, 84, 85, 86, 354/87, 88, 79, 149.11, 152, 154, 155, 158, 211, 219, 224, 225, 288, 187; 430/206

[56] References Cited

U.S. PATENT DOCUMENTS

| | | | |
|---|---|---|---|
| 2,854,903 | 10/1958 | Land et al. | 354/86 |
| 3,229,605 | 1/1966 | Eloranta | 354/84 |
| 3,314,792 | 4/1967 | Land | 354/86 |
| 3,405,619 | 10/1968 | Land | 95/13 |
| 3,446,131 | 5/1969 | Cook et al. | 354/83 |
| 3,613,543 | 10/1971 | Mita et al. | 354/154 |
| 3,683,770 | 8/1972 | Land et al. | 354/187 |
| 3,702,580 | 11/1972 | Erlichman | 95/13 |
| 3,722,389 | 3/1973 | Costa et al. | 354/187 |
| 3,735,685 | 5/1973 | Plummer | 95/42 |
| 3,754,458 | 8/1973 | Plummer | 354/154 |
| 3,760,704 | 9/1973 | Baker | 95/42 |
| 3,785,267 | 1/1974 | Asano | 354/87 |
| 3,800,309 | 3/1974 | Land | 354/152 |
| 3,875,579 | 4/1975 | Mochizuki | 354/154 |
| 3,907,563 | 9/1975 | Land | 430/206 |
| 3,955,206 | 5/1976 | Hashimoto | 354/152 |
| 4,006,971 | 2/1977 | Plummer | 350/293 |
| 4,086,604 | 4/1978 | Douglas | 354/219 |
| 4,114,166 | 9/1978 | Driscoll et al. | 354/86 |
| 4,241,986 | 12/1980 | Thomson | 354/193 |
| 4,265,525 | 5/1981 | Stella et al. | 354/76 |
| 4,389,110 | 6/1983 | Pizzuti | 354/126 |
| 4,452,520 | 6/1984 | Kaplan | 354/126 |
| 4,545,661 | 10/1985 | Hamaguchi et al. | 354/86 |
| 4,569,578 | 2/1986 | Stella et al. | 354/86 |
| 4,597,656 | 7/1986 | Yamashita | 354/193 |
| 4,601,561 | 7/1986 | Yamashita | 354/193 |

OTHER PUBLICATIONS

"Leica R5", British Journal of Photography, 30 Jan. 1987, pp. 118, 119, 120, 125 and 126, author L. Andrew Mannheim.

*Primary Examiner*—A. A. Mathews
*Attorney, Agent, or Firm*—David R. Thornton

[57] ABSTRACT

A compact, folding camera construction for exposing and processing cassette contained film in which a pair of nestable housings carry major optical components between a folded configuration in which they are located in space between cassette film housings and an erect operating position. Processed film, after exposure, is retained in a camera chamber from which it may be easily removed for viewing. SLR viewing is provided with the view path generally retained within the camera volume utilized for exposure.

19 Claims, 8 Drawing Figures

COMPACT FOLDING CAMERA CONSTRUCTION

RELATED APPLICATIONS

This is a continuation-in-part of application Ser. No. 866,066, filed May 20, 1986, now abandoned, which in turn was a continuation of application Ser. No. 751,661, filed June 24, 1985, now abandoned.

BACKGROUND OF THE INVENTION

This invention relates to photographic apparatus and, more particularly, it concerns a compact folding camera construction especially suited for the exposure and processing of two component film systems to provide a photograph directly available for viewing.

Commonly assigned, copending applications Ser. No. 747,899, filed June 24, 1985, now U.S. Pat. No. 4,630,912 entitled "WET PROCESSING WEB CAMERA AND METHOD" and Ser. No. 747,901, filed June 24, 1985, now U.S. Pat. No. 4,630,915, entitled "MULTI-PART CASSETTE FOR TWO COMPONENT FILM SYSTEM" disclose developments by which the two-component film system disclosed in commonly assigned U.S. Pat. No. 3,907,563 issued to Edwin H. Land on Sept. 23, 1975, is incorporated in a cassette system which substantially solves the problems associated with handling, packaging and storage of the film both prior to and after it has been loaded into a camera for sequential exposure and processing of successive film frames. In the two-component film system of the Land patent, an image receiving film component, which is not sensitive to actinic light, is impregnated with an alkaline, liquid processing agent. The negative film component includes a web-like support coated by a polymeric acid layer, a timing layer, a dye developer layer and a silver halide layer. After exposure of the silver halide layer on the negative component, the two sheets are brought together in face-to-face contact as a laminate with the several active coating layers sandwiched between the supporting substrates of the respective components. The processing agent operates to transfer the latent image formed by exposure of the silver halide layer of the negative to the image-receiving layer directly behind the transparent support of the receiver or positive sheet component. The acid layer in the original negative sheet neutralizes the alkaline processing fluid but under the control of the timing interlayer situated between the acid layer and the remaining layers of the composite laminate.

The two component system of the aforementioned Land patent is both less expensive and, in many ways, superior to present commercially available instant film systems which rely on a combination of complex film unit assemblages and require precision in processing apparatus to achieve the correct spread of processing fluid, usually supplied in a rupturable pod forming part of the film unit, throughout the area of the final photograph. The major problems presented to a viable commercial system using the two component film system of the Land patent, lie in the need for keeping separate the positive and negative film components until after exposure and in the need for hermetically sealing the liquid impregnated positive component to assure retention and availability of the liquid processing agent until it is needed for processing the film system after exposure. These problems have been addressed and essentially circumvented by the disclosures of the aforementioned copending applications.

SUMMARY OF THE PRESENT INVENTION

In accordance with the present invention, an extremely compact folding camera is provided which is particularly though not exclusively, adapted for exposure, processing and viewing of photographs from the cassette-packaged, two-component film system of the type aforementioned.

The camera body is configured to envelope a film cassette having a pair of cylinder-like housings projecting upwardly at the ends of a central platform section defining the exposure plane. First and second nested housings are pivotally mounted from the rear edge of the camera body and support major camera operating components for movement between a folded position, lying generally between the cylinder-like cassette housings, and an erect operating position in which the components are elevated above the body. Single-lens reflex viewing and exposure modes are accommodated by the combination of a double-sided, independently pivotal mirror and a pair of mirrors carried respectively by the camera body and the second housing. The independently pivotal mirror is movable from a position overlying the film plane, upwardly to an inclined position in which light passing from an objective lens carried by the first housing is reflected to the film plane.

In the context of its applicability to the two-component film system in which separately contained positive and negative film components supplied in the cassette housings are exposed and processed, the camera includes a processing roller pair, through which the two-film components are passed after exposure, and a cutter to sever each discrete photograph from the film component. The camera back is hinged as a door for supporting the processing roller and cutter and, in addition, provides a chamber into which the processed photographs are fed for storage which may permit direct viewing from the camera back with or without removal of the photograph from the storage chamber.

A principal object of the present invention, therefore, is to provide an extremely compact folding camera adapted for use with cassette-contained film systems. A further object of the present invention is to provide such a camera which is adaptable to single lens reflex operation and to the processing of two-component instant film systems. A still further object of the invention is to provide an instant camera system in which photographs processed by the camera may be viewed directly with or without removal of the photograph from the camera. Other objects and further scope of applicability of the present invention will become apparent from the detailed description to follow taken in conjunction with the accompanying drawings in which like parts are designated by like reference numerals.

DETAILED DESCRIPTION OF THE PREFERRED EMBODIMENT

Figure 1:
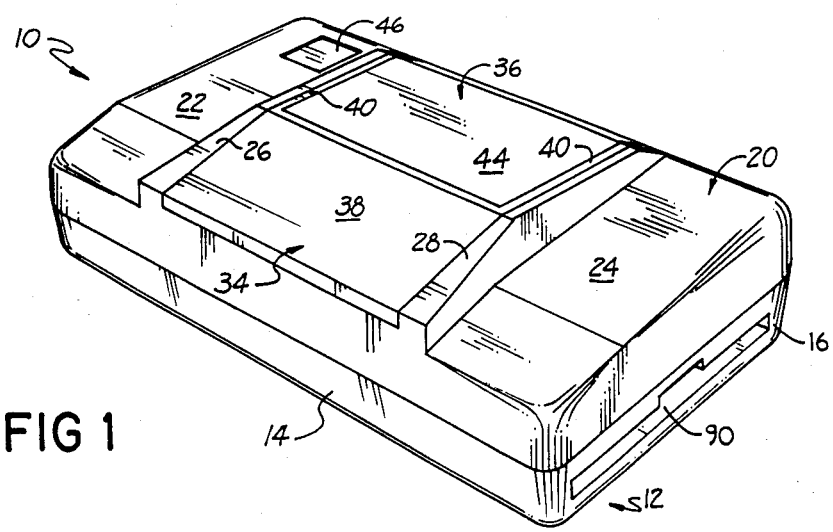
FIG. 1 is a perspective view of the camera of the present invention in its folded condition.
Figure 2:
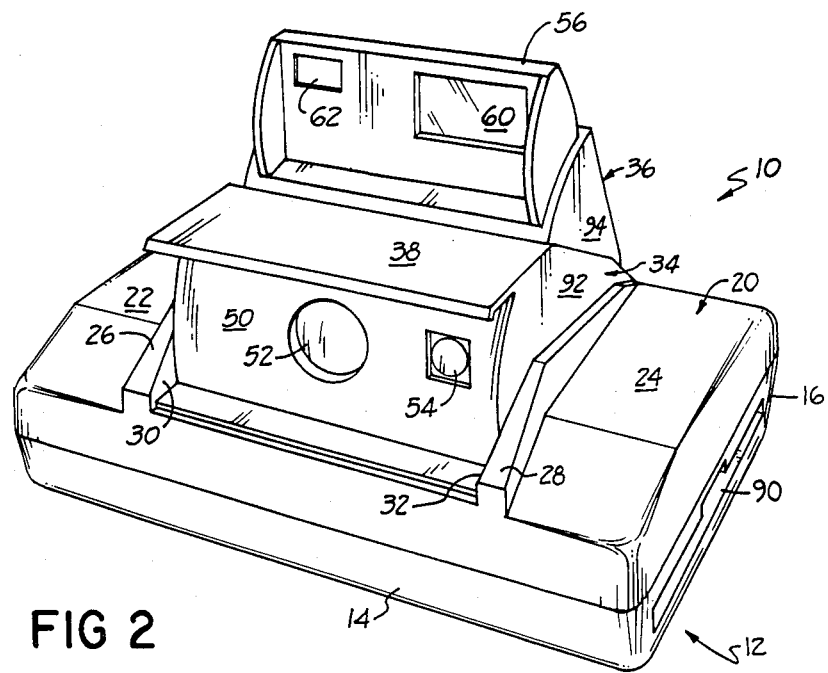
FIG. 2 is a perspective view of the camera in its erect or operative condition.
Figure 3:
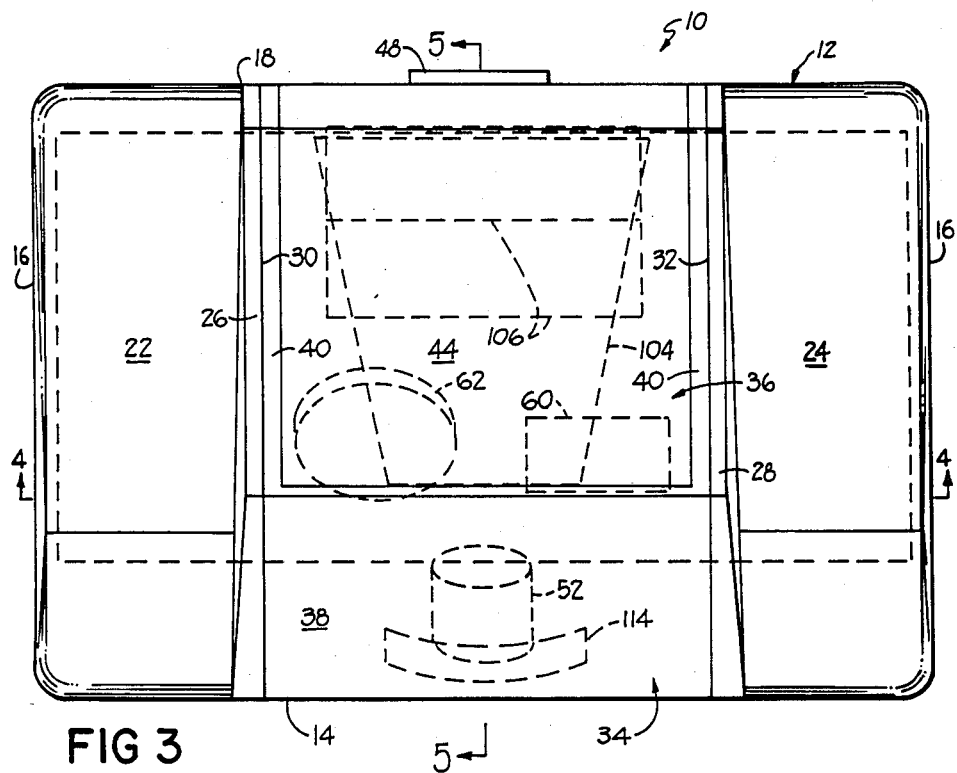
FIG. 3 is a plan view of the camera in its folded configuration with internal components illustrated in phantom lines.

In FIGS. 1-3 of the drawings, a preferred exemplary embodiment of a camera in accordance with the present invention is generally designated by the reference numeral 10 and shown to include a camera body 12 having an exterior configuration approximating a rectangular parallelepiped. As such, the body 12 includes a front wall 14, a pair of end walls 16, a rear wall 18, a bottom wall or door 19 (FIG. 4) and a top wall 20. The top wall 20, as shown most clearly in FIGS. 1-3, is defined by a pair of end panel sections 22 and 24 extending between and joining with the front, back and end walls 14, 18 and 16, respectively. The panel sections 22 and 24 join at their inboard edges with elevated rail-like formations 26 and 28, respectively. The formations 26 and 28, in turn, define a generally rectangular opening having side edges 30 and 32 (FIG. 3) extending from the front wall 14 to the rear wall 18. The opening between the edges 30 and 32 is closed by nested pivotal housings designated generally by the reference numerals 34 and 36. The housing 34 includes a top wall 38 joined through a pair of side arms 40 and by a pivot pin 42 (FIGS. 5 and 6) with the rear wall 18 of the camera body 12. The housing 36 also includes a top wall 44 nested between the side arms 40 and the rear edge of the top wall 38 of the housing 34. The housing 36 is also connected to the rear wall 18 by the pivot pin 42.

In FIGS. 1-3 of the drawings, the organization of external camera operating components may be seen in their relationship to the camera body 12 and the housings 34 and 36. Specifically, an actuating button 46 (FIG. 1) is presented to the rear of the top wall panel section 22 whereas a viewing eyepiece 48 (FIG. 3) is presented from the rear wall 18. All other externally presented components are supported by the respective pivotal housings 34 and 36. Specifically, as shown in FIG. 2, the housing 34 carries a rigidly connected lens board 50 for supporting an objective lens 52, a photocell window 54 and other exposure control components, such as an internally mounted shutter and shutter actuating assembly (not shown).

The housing 36 carries a pivotal photoflash unit 56 having a front face 58 from which a flash lamp 60 and associated ranging window 62 are presented. As will be seen from the description to follow, the unit 56 pivots from the position shown in FIG. 2, forwardly and downwardly, for movement of the housing 36 to its folded condition.

Figure 4:
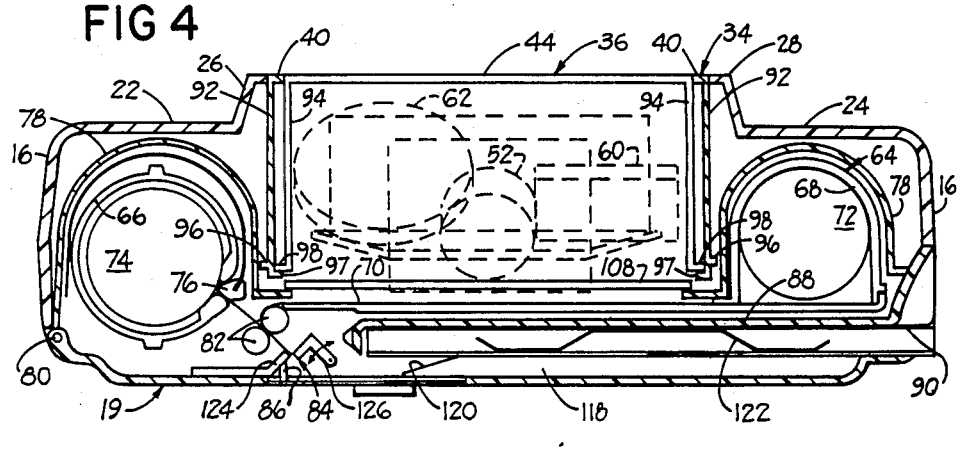
FIG. 4 is a cross-section on line 4—4 of FIG. 3.

An understanding of the interior design and construction of the camera 10 may be had by reference to Figs. 3-6 of the drawings. In this respect, the body 12 in the illustrated embodiment is adapted to receive a film cassette of a type described and illustrated in the above-mentioned U.S. Pat. Nos. 4,630,912 and 4,630,915, the disclosures of which are expressly incorporated herein by reference to the extent they are needed for complete understanding of the present invention. A cassette of this type is shown in FIG. 4 and designated generally by the reference numeral 64. The cassette 64 includes a pair of cylinder-like housings 66 and 68 projecting upwardly at opposite ends of a central platform section having a planar deck 70 along which a negative film is passed in a film plane from a coil 72 packaged in the housing 68. A positive film component is supplied from a coil 74 in the other cassette housing 66 which is equipped with a stopper 76 for sealing purposes, all as fully described in the cited copending applications.

To accommodate the shape of the cassette 64, the body 12 includes an interior liner 78 of a configuration to complement the shape of the cassette 64. The liner cooperates with the door 19 to provide a light-tight enclosure for the cassette 64. The door 19 is in the nature of a hinged back pivotally connected to one sidewall 16 by a hinge 80 and secured by a latch (not shown) to the opposite sidewall 16. The hinged back or door supports a pair of processing rollers 82, a cutoff mechanism 84, a slidable film pusher 86 and a photograph storage receptacle defined in part by the bottom wall or door 19 and an inner wall 88 which opens at its outer end in a slot 90 for removal of finished photographs. Additional structural features of the door 19 will be described in more detail below.

As may be seen in FIGS. 3-6, the pivotal camera housings 34 and 36, together with the operative components supported by these housings, lie in the space between the cassette housings 66, 68 and the corresponding portions of the liner 78. Each of the camera housings, moreover, is of inverted U-shaped configuration as a result of sector-shaped sidewalls 92 depending from the top wall 38 and the side arms 40 of the housing 34 and of similarly shaped side walls 94 depending from the top wall 44 of the housing 36. The bottom edges of the respective side walls 92 and 94 are provided with outwardly projecting flanges or lips 96 and 98 which function to provide light sealing in the erect position and stops to limit opening movement of the respective housings 34 and 36. Additionally, the housing 34 carries inward directed lips or tabs 97 at its lowermost edge to engage the lip 98 of the rear housing 36 as the latter moves to its closed position.

As above indicated, the forwardly disposed or outer housing 34 supports the lens board 50 and the objective lens 52. The lens board 50 is fixed directly to the top wall 38 and between the side walls 92 of the housing 34. The housing 34, and thus the lens board 50 and lens 52, is moved between a folded position illustrated in FIG. 5, in which the top wall 38 rests along the top of the front wall 14, and an erect position, illustrated in FIG. 6, in which the outwardly projecting lips 96 engage under the formations 26 and 28 as well as under a flange 100 at the top of the front wall 14.

Figure 5:
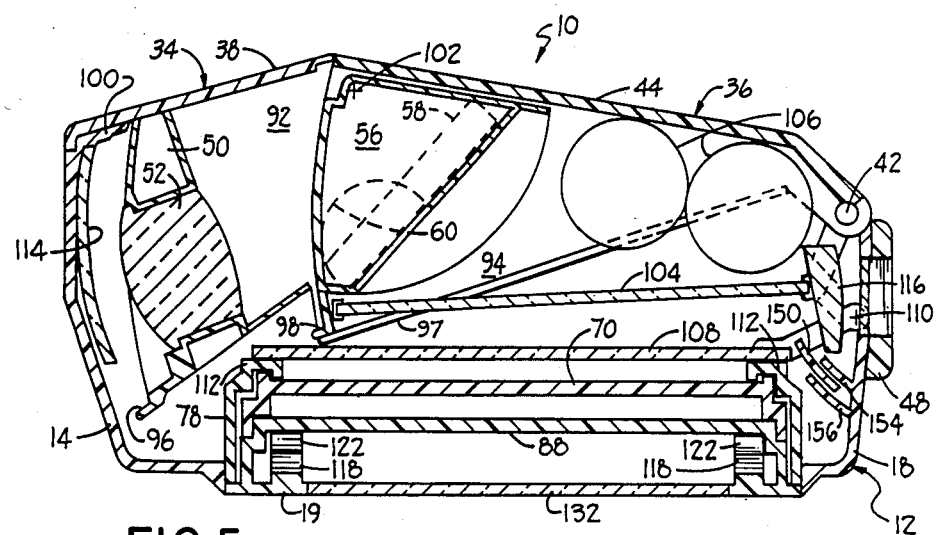
FIG. 5 an enlarged cross-section on line 5—5 of FIG. 3.
Figure 6:
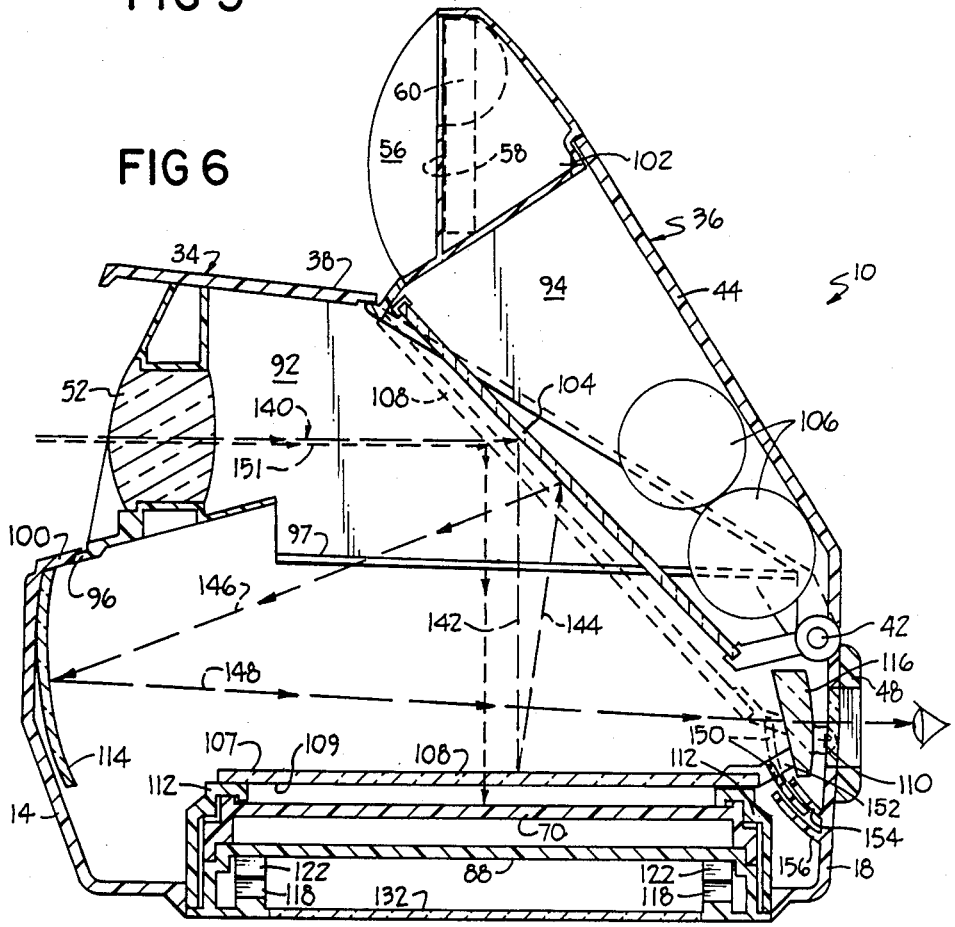
FIG. 6 is a cross-section similar to FIG. 5 but illustrating the camera in its erect condition.
Figure 7:
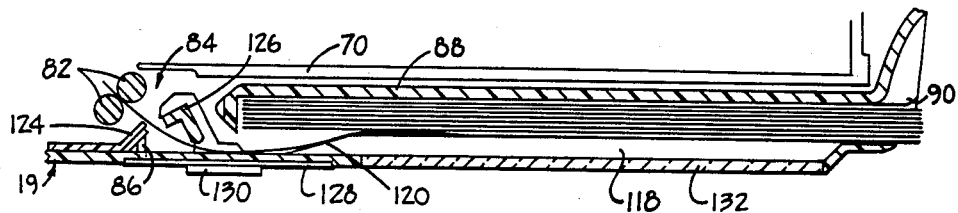
FIG. 7 is an enlarged fragmentary cross-section showing components illustrated in FIG. 4 but at a larger scale.
Figure 8:
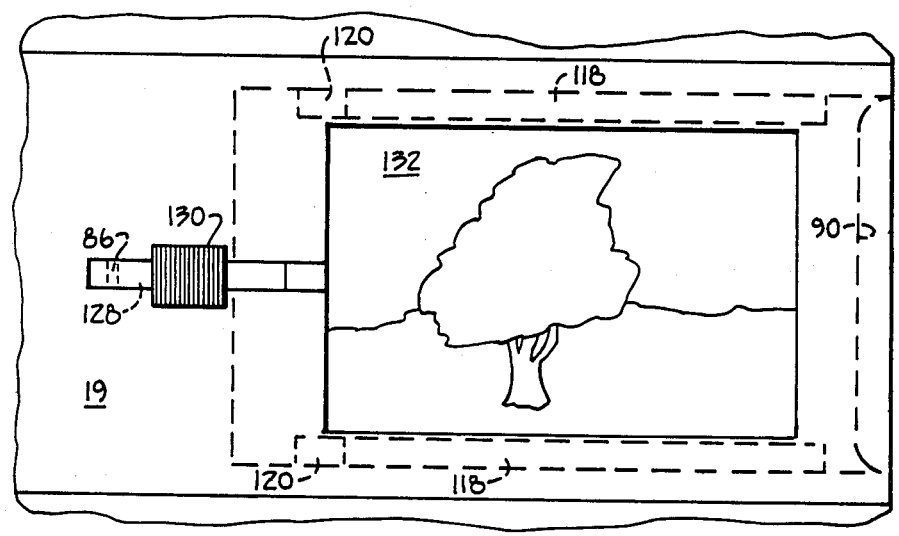
FIG. 8 is a fragmentary bottom view of the camera.

The inner and rearwardly disposed housing 36 pivotally supports the photoflash unit 56 from the side walls 94 of the housing 36 for movement about an axis 102 intersecting the side walls 94 of the housing 36. As a result of this pivotal mounting, the unit 56 is positionable pivotally with respect to the housing 36 between a folded condition as shown in FIG. 5 and an erect position as shown in FIG. 6. Additionally, it will be noted that the unit 56, in the folded posi- tion, lies between the top wall 44 of the housing 36 and a trapezoidal mirror 104 supported for movement directly with the housing 36 about the pivot pin 42. Finally, a pair of storage cells or batteries 106 are carried by the housing 36 between the top wall 44 ahd the mirror 104 and rearwardly of the folded photoflash unit 56.

To enable single lens reflex operation of the camera 10, a double-sided mirror 108, the upper side 107 being a Fresnel mirror and the underside 109 being a plane mirror, is independently pivoted from an axis 110 between a viewing position, in which the mirror 108 overlies a frame of negative film lying on the cassette deck 70, and an exposure position, depicted by phantom lines in FIG. 6 and in which the mirror 108 is elevated to an inclined attitude above the cassette deck 70. The viewing position of the mirror 108 is established by a pair of ledges 112 secured directly to the liner 78. As a further incident to viewing, a concave aspheric mirror 114, which in a first approximation is a portion of an ellipsoidal mirror, is fixed behind the front wall 14 and optically aligned with an eye lens 116 positioned forwardly of the external eyepiece 48.

The optical paths, for viewing, with the mirror 108 in its lower position, and for exposure, with the mirror 108 elevated to the upper inclined position shown in FIG. 6, may now be understood. With the mirror 108 in its lower position, image light is transmitted from the scene along a path 140 traversing and spaced above the focal plane represented by the cassette deck 70 (the principal ray being illustrated as a dashed line) to the inclined, fixed mirror 104 and reflected therefrom along a path 142 at approximately 90° to the Fresnel mirror provided by the surface 107 of the double sided mirror 108. The Fresnel mirror, in turn, reflects the image light rearwardly along a path 144 at a small angle to the incoming path 142 to again impinge upon the viewing mirror 104. The reimaging on the fixed mirror 104 redirects the image rays forwardly and downwardly along a path 146 directed between the lens 52 and the leading end 147 of the mirror 108. The downwardly reflected rays traveling along path 146 are, in turn, reflected by the concave mirror 114 along a path 148 which traverses the mirror 108 and the camera focal plane to the eye piece 48. In the illustrated arrangement, the rays reflected from the mirror 114 along the path 148 are at a slight angle to the camera focal plane. This is corrected by a wedge-shaped eye lens 116 so that the image appears to the viewer to be parallel to the image path 140.

The Fresnel-type surface or Fresnel mirror formed on surface 107 of the double-sided mirror 108 is similar to that described in U.S. Pat. No. 3,735,685 issued to William T. Plummer on May 29, 1973, with the surface rotated approximately 180° to provide a rearward reflection of the image as shown, for example, in U.S. Pat. No. 3,760,704 issued to James G. Baker on Sept. 25, 1973.

In the present arrangement in the viewing mode, the image initially reflected from the fixed mirror 104 is reflected from the Fresnel surface 107 to form a conjugate image of the exit pupil of the taking lens 52 formed along the path 146 at a point falling within the exposure volume as defined by the extreme rays (not shown).

As illustrated herein, the concave mirror is positioned forwardly of the film plane or cassette deck 70 to provide a recess for displacement of the lens 52 into the camera base when the camera is folded. However, it should be understood that the mirror position may also be located closer to the leading edge of the film plane, while retaining the compact viewing path configuration, in camera configurations not requiring such recess.

For the exposure operation, the double sided mirror 108 is driven upwardly to the position shown in dotted lines in FIG. 6 so that the incoming light from the scene, the principal ray being shown by dotted lines and designated as 151, is reflected from a planar mirror 107 provided on the underside of the double mirror 108 to the film unit presented at the focal plane.

Any suitable means for pivoting the double sided mirror 108 between its viewing position overlying the focal plane and its inclined position overlying the inclined mirror 104 are suitable. In this regard, the mirror operation as presented in U.S. Pat. No. 3,685,416, issued to E. H. Coughlan on Aug. 22, 1972, will be suitable for this purpose.

Since the eyepiece 48 opens within the camera body in communication with the exposure chamber, it can produce light leakage to the film when the mirror 108 is raised to its inclined position. This light leakage is controlled in the present arrangement by a light blocking arrangement utilizing a light shield or blade 150 which is fixed to and extends between the mirror supports, only one of which is shown and designated as 152. The light blade 150 extending between the pair of supports provides an opaque shield located in position to adequately block any light which may enter the opening in eyepiece 48 when the mirror is moved to its erect position. To ensure adequate light blocking, the blade 150 extends within a channel provided by a pair of fixed blade members 154 and 156 so as to provide a light labyrinth with the blade member 150.

As can be seen in FIG. 6, the blade 150 is designed so that it will not interfere with or block viewing rays traveling from the mirror 114 to the eye piece 48 in the viewing mode, but will be carried with the double sided mirror 108 upwardly in front of the eye lens 116 to adequately block the light rays during the exposure mode. In this regard, while the blade 150 does not extend above the surface 109 of the double sided mirror 108, the mirror when raised will also provide blocking of rays entering through the eyepiece 48 so that, in conjunction with the shield 115, light is adequately precluded from reaching the focal plane when the mirror is in its erect position. It is to be understood, of course, that the mirror must be rapidly moved between its film covering position and its inclined position to limit light rays from entering during intermediate positions of the mirror. Consequently, the blade 150, in conjunction with the channel forming blades 154 and 156 provide means for blocking the transmission of light through the eyepiece to the film plane when the mirror 108 is in its exposure position and, more particularly, such means responsive to actuation of the mirror 108 to displace it towards its exposure position.

Other arrangements for precluding light rays can be provided by a multiblade shutter (not shown) mounted in alignment with the eyepiece 48, e.g., between it and the lens 116. The shutter would be arranged so that it would be in an open position during the viewing mode of the camera and driven to a closed light blocking position as the camera is converted from the viewing mode to the exposure mode. That is, the shutter could consist of a pair of mutually coupled blades pivotable between an open and closed position and coupled to either the mirror itself or the driving means of the mirror for pivotable closure of the shutter just prior to or at the initiation of mirror movement toward its exposure position.

For viewing with the mirror 108 in its lower position, image light reflected from a scene to be photographed passes along the paths indicated by the dashed line in FIG. 6. Thus, after passing the objective lens 52, the image light is reflected from the erected mirror 104 supported by the housing 36, downwardly to the upper surface of the mirror 108, slightly rearwardly, back to the mirror 104, then forwardly to the concave mirror 114, and rearwardly through the eye lens 116. When the reflex mirror 108 is moved upwardly during performance of an exposure cycle, light passing from the scene takes the path of the dotted line in FIG. 6, through the lens 52 to the bottom surface of the reflex mirror 108 and down to the negative film supported on top of the cassette deck 70.

The structural details of the hinged back or door 19 will now be described with reference to FIGS. 4, 5, 7 and 8 of the drawings. As indicated above with reference to FIG. 4, the door 19 supports the processing rollers 82, cutoff knife 84, pusher 86 and the inner wall 88 defining a finished photograph receptacle which can provide either light shielded storage, i.e., a darkened imbibition chamber, or a photograph viewing chamber. Extending along the inner surface of the door 19 under the wall 88 are a pair of rails 118 having inclined ramp surfaces 120 facing in the direction of feed from the processing rollers 82. The rails 118 are spaced to be positioned along the side margins of the photographs passing from the processing rollers as may be seen in FIGS. 5 and 6 of the drawings, for example. Also, a pair of photograph hold down springs 122 are disposed between the rails 118 and the wall 88. It will be noted further that the rails 118 are of the length such that the ramps 120 do not extend for the full length of a photograph positioned on the rails by the springs 122.

Although the cutting mechanism may take a variety of different specific forms, in the disclosed embodiment the cutting mechanism is in the nature of an inclined anvil 124 and a pivotal shear blade 126. Thus, as the laminate of positive and negative film units passes the processing rollers 82, it is fed downwardly against the door, through the cutting mechanism 84, up along the ramps 120 onto the rails 118 and under any previous photograph existing in the chamber between the wall 88 and the door 19. When the cutting mechanism 84 is actuated, the rear end of the photograph will lie under the anvil 124. It will be noted in FIG. 7 that the pusher 86 underlies the anvil 124 and is carried by a slide 128 having an actuating knob or button 130 projecting to the exterior of the door 19. Thus, after the film has been severed by the cutting mechanism 84, the pusher 86 may be operated manually to advance the completed photograph completely onto the rails 118. Automatic advancement of the pusher can also be provided. Thereafter, the photograph may be removed from the camera for viewing or it may be left in place. In this latter respect, where light shielded imbibition is unnecessary, the door 19 is provided with a transparent window 132 through which the last-taken photograph may be viewed directly without its removal from the camera.

In use, the cassette 64 is first loaded into the camera 10 through the hinge back or door 19 and the leading ends of the respective negative and positive film units 72 and 74 engaged in the nip between the processing rollers 82. In this respect, the film components may include a common leader which is advanced through one exposure cycle as a "dark slide" and removed from the camera.

To erect the camera for use, a latch mechanism (not shown) is released so that the two housings 34 and 36 will be biased by springs (not shown) at the hinge pin 42, upwardly to the position shown in FIG. 6. In the case of the rear housing 36, the flash unit 56 will pivot upwardly to the position shown in FIG. 6 as the housing 36 reaches its final erect position. In the erected condition of the camera, an image to be photographed may be viewed through the eyepiece 48, and the actuating button 46 depressed to initiate an exposure cycle. During the exposure cycle, the mirror 108 raises to the phantom line position shown in FIG. 6, the shuttter is actuated and the negative film unit overlying the deck 70 of the cassette will be exposed. Thereafter, the processing rollers 82 are actuated to feed the positive and negative film units into face-to-face contact with each other for processing, through the cutting mechanism 84, and onto the ramps 88 in the chamber between the door 19 and the wall 88. The pusher is then manually actuated to position the photograph where it may be viewed through the window 132.

A releaseable, spring biased latch mechanism (not shown) having a release arm (not shown) extending through the rear wall 18 of the camera body is employed to engage and latch the rear housing 36 in its folded position. For example, the latch may be configured to engage the lip 48 of the housing 36 when the latter is in the folded configuration. The housing 36, in turn, through the tabs 47, engages and holds closed the forward housing 34. To insure that the flash unit 56 remains in its folded position during and upon closure, a pair of curved ridge rails (not shown) are provided along the interior surfaces of the side walls 42 of the housing 34 for engagement with the flash unit.

To return the camera components to the folded condition illustrated in FIGS. 1 and 5, for example, the photoflash unit 56 is first folded about its pivot 102. The rear housing 36 will then fold within the front housing 34 and then both the rear housing and the front housing will be folded down to the camera body 12.

Thus it will be appreciated that as a result of the present invention, an extremely compact and efficient folding camera is provided particularly for exposing, processing and viewing photographs originating in a two-component film system of the type described. Also, it will be understood that variations and/or modifications in the embodiment illustrated and described herein may be made without departure from the present invention. Accordingly, it is expressly intended that the foregoing description and accompanying drawing illustrations are illustrative of a preferred embodiment only, not limiting, and that the true spirit and scope of the present invention be determined from the appended claims.

What is claimed is:

1. A folding camera for exposing photographic film supplied in a cassette having a pair of cylinder-like housings at opposite ends of a central platform section, said camera comprising:
    a body for defining a light-tight chamber to receive the cassette with said cylinder-like housings disposed near opposite ends of the body;
    a first pivotal housing movable between a folded position overlying said central platform section between said cylinder-like housings and an erect position projecting upwardly from said body; and
    a second pivotal housing lying within said first pivotal housing and movable between a folded position between said cylinder-like housings and an erect position projecting upwardly from said first pivotal housing.

2. A folding camera as recited in claim 1, including an objective lens fixedly supported from said first pivotal housing and movable therewith within said body in the folded position of said first pivotal housing.

3. A folding camera as recited in claim 2, including a photoflash unit supported on said second housing for movement between an inoperative, compact position within said second housing and an operative position extended from said second housing.

4. A folding camera as recited in claim 3, wherein said photoflash unit is pivotally mounted on said second housing for pivotal movement, once said second housing is erected, from an inoperative position within said second housing to an operative position extended from said second housing.

5. A folding camera as recited in claim 4, wherein said photoflash unit pivots upwardly above said objective lens in the erect positions of said first and second housings.

6. A folding camera as recited in claim 1, including a hinged back on the bottom of said body and movable between opened and closed positions to enable loading and unloading of the cassette to and from said light-tight chamber.

7. A folding camera as recited in claim 6, wherein said hinged back includes means for storing and viewing photographs resulting from exposure of the film supplied in the cassette.

8. A folding camera as recited in claim 7, including means for processing the photographic film supplied in the cassette after exposure, said processing means including a pair of pressure rollers supported by said hinged back.

9. A folding camera as recited in claim 8, wherein said means for storing and viewing photographs is located to receive film components passing through said processing means and includes a transparent window for viewing processed film components.

10. A folding camera comprising:
a camera body configured for receiving photographic film for presentation for exposure at a given focal plane within said body;
a first housing section carrying an objective lens at one end thereof;
a second housing section carrying a flash unit at one end thereof; and
said first and second housing sections being mounted on said body for pivotal movement thereto and each other at the ends opposite their said one ends between an inoperative folded position wherein said second section is nested in said first section and said first section is nested in said body in overlying relation to said focal plane and an operative erect position wherein said one end of said first housing projects upwardly from said body and said one end of said second housing section projects upwardly from said first section.

11. The camera of claim 10 wherein said flash unit is mounted in said second section for movement between an inoperative, compact position within said second section when said second section is in its folded position and an operative position extending from said one end of said second section when said second section is in its said erect position.

12. The camera of claim 11 wherein said flash unit is pivotally mounted on said second section for pivotal movement between its said inoperative and operative positions.

13. The camera of claim 11 wherein said lens is fixedly mounted to said one end of said first section and movable therewith to a location within said body in the folded position of said first section.

14. The camera of claim 10 including a reflex through-the-lens viewing system including a viewing path extending through said objective lens and reflected by a plurality of mirrors to a viewing eyepiece, and one of said mirrors is mounted in said body forwardly of said film plane to form a recess in said body between said one mirror and said focal plane, and said objective lens is positioned rearwardly of said one mirror within said body recess when said first section is in its folded condition.

15. A folding single lens reflex camera comprising:
a body configured for receiving photographic film for presentation for exposure at a given focal plane within said body;
a housing section carrying an objective lens at one end, said housing section being mounted on said body for movement between an inoperative folded position, wherein said objective lens is located within said body, and an operative, erect position wherein at least said one end of said housing section and said objective lens is positioned upwardly above said body; and
a reflex through-the-lens viewing system including a viewing path extending through said objective lens and reflected by a plurality of mirrors to a viewing eyepiece, one of said mirrors being mounted in said body in spaced relation to said focal plane so as to form a recess in said body between said one mirror and said focal plane, and said objective lens is positioned within said recess when said housing is in its folded condition.

16. A compact single lens reflex camera comprising a camera body including means for receiving photographic film for presentation at a given focal plane for exposure to a photographic scene;
a lens mounted in said camera body for directing scene light to the interior of the body along a given path traversing and spaced above said focal plane;
a first mirror mounted in said body in inclined relation to said given path so as to direct scene light rays from said given path toward said focal plane;
a second mirror comprising a double sided mirror mounted in said body for movement between a viewing position overlying said focal plane, wherein the one side of said double sided mirror facing away from said focal plane redirects light back to said first mirror, and an exposure position overlying said first mirror, wherein the other side of said double sided mirror directs scene light from said given path to said focal plane, said one side of said double sided mirror being configured for reflecting scene light received from said first mirror upwardly and rearwardly to again impinge on said first mirror for a second reflection therefrom along an inclined path extending both forwardly and downwardly at an angle to said given path of said lens;
an opening provided in the rear of said camera body for viewing along a viewing path spaced between said given path of said lens and said second mirror when said second mirror is in its said viewing position; and
a third mirror mounted in said camera body in intercepting relation to said inclined path for redirecting the second reflection from said first mirror across the camera focal plane toward said opening whereby said viewing configuration provides a compact camera arrangement having a folded viewing path generally confined to an exposure chamber of the camera.

17. The camera of claim 16 including light blocking means for blocking light from said opening from reaching the film presented at said focal plane when said second mirror is in its said exposure position.

18. The camera of claim 16 wherein said opening is provided in said camera body for viewing along a path located between the lower edge of said first mirror and the upper surface of said second mirror when said second mirror is in its viewing position.

19. The camera of claim 18 wherein said third mirror redirects said second reflection from said first mirror across said focal plane along a view path at a small angle to said given path of said lens, and said camera further comprising an eye lens located over said opening and configured for realigning said view path into parallel with said given path.

* * * * *